US008306955B2

United States Patent
Walker et al.

(10) Patent No.: US 8,306,955 B2
(45) Date of Patent: Nov. 6, 2012

(54) DATA MANAGEMENT (75) Inventors: Matthew D Walker, Felixstowe (GB); Nicholas J Sim, Ipswich (GB); Rory S Turnbull, Ipswich (GB)

(73) Assignee: British Telecommunications public limited company, London (GB)

( * ) Notice: Subject to any disclaimer, the term of this patent is extended or adjusted under 35 U.S.C. 154(b) by 35 days.

(21) Appl. No.: 12/920,560

(22) PCT Filed: Jan. 19, 2009

(86) PCT No.: PCT/GB2009/000137
§ 371 (c)(1),
(2), (4) Date: Sep. 1, 2010

(87) PCT Pub. No.: WO2009/109734
PCT Pub. Date: Sep. 11, 2009

(65) Prior Publication Data
US 2011/0004600 A1  Jan. 6, 2011

(30) Foreign Application Priority Data
Mar. 3, 2008  (EP) .................................... 08250723

(51) Int. Cl.
*G06F 7/00* (2006.01)
*G06F 17/00* (2006.01)

(52) U.S. Cl. ........ 707/692; 707/748; 707/794; 707/827; 707/959; 709/219; 709/227

(58) Field of Classification Search .................. 707/748, 707/794, 827, 959, 692; 709/219, 227
See application file for complete search history.

(56) References Cited

U.S. PATENT DOCUMENTS

| 7,353,350 | B2* | 4/2008 | Klassen et al. ................. 711/159 |
| 7,653,761 | B2* | 1/2010 | Juster et al. ..................... 710/18 |
| 7,657,652 | B1* | 2/2010 | Balaji ........................... 709/242 |
| 7,792,522 | B1* | 9/2010 | Bussey et al. ................. 455/418 |
| 7,930,431 | B2* | 4/2011 | Kuroiwa et al. ............... 709/246 |
| 2002/0062361 | A1 | 5/2002 | Kivipuro |

(Continued)

FOREIGN PATENT DOCUMENTS

| GB | 2 387 074 A | 10/2003 |
| WO | 02/056563 A | 7/2002 |
| WO | 03/026250 A1 | 3/2003 |
| WO | 2006/073983 A | 7/2006 |

OTHER PUBLICATIONS

International Search Report dated Mar. 17, 2009 issued in International Application No. PCT/GB2009/000137.

(Continued)

*Primary Examiner* — Phong Nguyen
(74) *Attorney, Agent, or Firm* — Nixon & Vanderhye P.C.

(57) ABSTRACT

There is proposed a method of side-loading content onto a mobile device, preferably using a WiFi connection, from a network content store and storing it on the device for viewing later. The method automatically determines when to delete stored content, and more importantly, what content should be transferred over the network in the first instance. The system comprises a content manager which takes into account various parameters to determine what should be transferred and, if required, what should be deleted from the device. The parameters used include user profiles, size of a potential download, as well as available storage space on the device and the predicted duration the device will be in range of a wireless hotspot or broadcast network.

17 Claims, 5 Drawing Sheets

U.S. PATENT DOCUMENTS

| | | |
|---|---|---|
| 2002/0143972 A1 | 10/2002 | Christopoulos |
| 2003/0037041 A1* | 2/2003 | Hertz ............................... 707/1 |
| 2003/0217057 A1* | 11/2003 | Kuroiwa et al. ................... 707/7 |
| 2004/0033777 A1 | 2/2004 | Farineau et al. |
| 2004/0198426 A1 | 10/2004 | Squibbs |
| 2006/0008256 A1 | 1/2006 | Khedouri et al. |
| 2006/0163358 A1 | 7/2006 | Biderman |
| 2007/0073989 A1* | 3/2007 | Sharma et al. ................ 711/165 |
| 2007/0220552 A1* | 9/2007 | Juster et al. ..................... 725/46 |

OTHER PUBLICATIONS

Muntean, C. H. and McManis, J., "Fine Grained Content-based Adaptation Mechanism for Providing High End-User Quality of Experience with Adaptive Hypermedia Systems", Performance Engineering Laboratory, Dublin City University, Dublin, Ireland, WWW 2006, May 23-26, 2006, Edinburgh Scotland, 10 pgs.

* cited by examiner

DATA MANAGEMENT

This application is the U.S. national phase of International Application No. PCT/GB2009/000137 filed 19 Jan. 2009, which designated the U.S. and claims priority to European Application No. 08250723.7, filed 3 Mar. 2008, the entire contents of each of which are hereby incorporated by reference.

FIELD OF THE INVENTION

This invention relates to method of data management between a mobile device and a network data store, in particular a method of managing the transfer of data from the network data store onto the mobile device and if required to selectively delete data on the device to create sufficient storage for the transfer.

BACKGROUND TO THE INVENTION

Mobile devices today can provide a consumer with a wealth of services over those of traditional voice and data services. One such service is the delivery of multimedia content such as video clips and TV programs in general, and in particular, delivery of such content wirelessly. As multimedia content consumption has become more popular, techniques have been developed to enable more efficient delivery of the content to the consumer's mobile device. Currently, the most common delivery mechanisms are broadcasting, live streaming, and downloading.

Broadcast technologies send the same content to a large number of devices at the same time over a broadcast channel. Broadcasting is thus relatively efficient in terms of bandwidth use, though typically requires adapted devices to receive the broadcast content as well as dedicated broadcast networks to deliver the content.

Examples of current broadcast technologies include digital video broadcasting-handheld (DVB-H), digital multimedia broadcasting (DMB), and Multimedia Broadcast Multicast Service (MBMS).

Most mobile streaming services today are based around existing 3G mobile networks, and therefore require little or no modification to existing mobile phones and network. Streaming to mobiles is usually a unicast service, where content is sent in a continuous stream from a server to a single device and played as it arrives. It has several benefits aside from not requiring a dedicated broadcast network, including allowing the user to choose whatever content desired, and near instant access without having to wait for a complete file to be downloaded. However a significant drawback is that since a separate stream is required for each user, available network bandwidth can quickly become used up. Also, a permanent connection is required for users to watch content.

Increasingly, mobile devices are WiFi (IEEE 802.11) enabled and the WiFi connection can be used for video streaming. Streaming over a WiFi connection is relatively fast even when compared to the streaming over 3G connection. It also has the advantage of being much cheaper than streaming over a 3G connection, and many users now have WiFi coverage in their own homes as part of their ADSL connection, and public WiFi hotspots are increasing in number by the day.

Content can also be downloaded onto a device, stored, and then watched later whenever the user chooses. The download can be made over whatever network connection is available to the device, but the most common are over a 3G network connection or WiFi. Downloading has advantages in that both the average instantaneous bit-rate of the content is decoupled from the underlying transfer rate—a higher quality piece of content with a higher data rate can now be consumed—the user simply has to wait longer for that content to arrive. The disadvantage of this system is, of course, that the user now has to wait for the content to arrive.

SUMMARY OF THE INVENTION

It is the aim of embodiments of the present invention to address one or more of the above stated problems, and to provide an improved system for managing content on a mobile device.

According to one aspect of the present invention, there is provided a method of data management between a mobile device and a network data store in a wireless network, said method comprising:

(i) establishing a connection between the mobile device and the network data store by way of a wireless access point;

(ii) estimating a connection duration between the mobile device and the wireless access point, and the bandwidth of the connection between the mobile device and the wireless network;

(iii) determining if the mobile device has sufficient available storage for storing a network file selected from the network data store;

(v) determining if there is sufficient time to transfer the selected network file from the network data store to the mobile device in dependence on the estimated connection duration and the estimated bandwidth; and (vi) transferring the selected network file from the network data store to the mobile device by way of the access point if it is determined that there is sufficient available storage and sufficient time to transfer the selected network file.

Preferably, the estimated connection duration takes into account prior connection history between the mobile device and said wireless access point.

The network content store may comprise a plurality of data files, and the selected network file is selected from the plurality of data files. The plurality of data files are preferably ranked in order of an interest parameter value, said interest parameter value based on a user profile, and the network file selected is the data file with the highest ranked interest parameter value. Furthermore, after the selected file is transferred, the data file with the next highest ranked interest parameter value can be selected.

The mobile device may comprise a plurality of device files ranked in order of the interest value, and if it is determined that the mobile device does not have sufficient available storage for the selected network file, then deleting one or more device files starting with the device file with lowest ranked interest parameter until the mobile device has sufficient available storage for the selected network file.

Preferably, the device files having an interest parameter value lower than that of the selected network file are deleted from the mobile device.

The data files may be multimedia files, such as video clips.
The network files transferred to the mobile device may be stored on the mobile device for later use/playback.

According to a second aspect of the present invention, there is provided a system for data management between a mobile device and a network data store in a wireless network, said system comprising:

a connection means for establishing a connection between the mobile device and the network data store by way of a wireless access point;

a connection duration estimator for estimating a connection duration between the mobile device and the wireless access point;

a bandwidth estimator for estimating the bandwidth of the connection between the mobile device and the wireless network;

a content manager for determining if the mobile device has sufficient available storage for storing a network file selected from the network data store, and for determining if there is sufficient time to transfer the selected network file from the network data store to the mobile device in dependence on the estimated connection duration and the estimated bandwidth; and means for transferring the selected network file from the network data store to the mobile device by way of the access point if it is determined that there is sufficient available storage and sufficient time to transfer the selected network file.

When the delivery method is downloaded over WiFi, the cost of delivery is very low (and is certainly much cheaper than delivering over a mobile cellular connection such as a 3G or GPRS connection). Thus, it may not matter at all if the content is not actually watched. The benefit to the user is that they can appear to have a much wider range of content, and/or the content that is delivered can be at a much higher quality as the volume of content is optimised.

The method results in more efficient data management where the transfer of data is optimised so that unnecessary data is not transferred (for example because it is too large or if it is determined that the user is unlikely to watch it). Furthermore, as the data is transferred in advance, and preferentially over a fast network such as WiFi, there are also no issues that usually arise from trying to stream over a connection with restricted bandwidth such as over 3G or GPRS.

BRIEF DESCRIPTION OF THE DRAWINGS

For a better understanding of the present invention reference will now be made by way of example only to the accompanying drawings, in which.

DESCRIPTION OF EXAMPLE EMBODIMENTS

The present invention is described herein with reference to particular examples. The invention is not, however, limited to such examples.

In examples of the present invention, there is proposed a method of loading content onto a mobile device, preferably using a WiFi connection, from a network content store and storing it on the device for viewing later. The method automatically determines when to delete stored content, and more importantly, what content should be transferred over the network in the first instance. The system comprises a content manager which takes into account various parameters to determine what should be transferred and, if required, what should be deleted from the device. The parameters used include user profiles, size of a potential download, as well as available storage space on the device and the predicted duration the device will be in range of a wireless hotspot or broadcast network.

Figure 1:
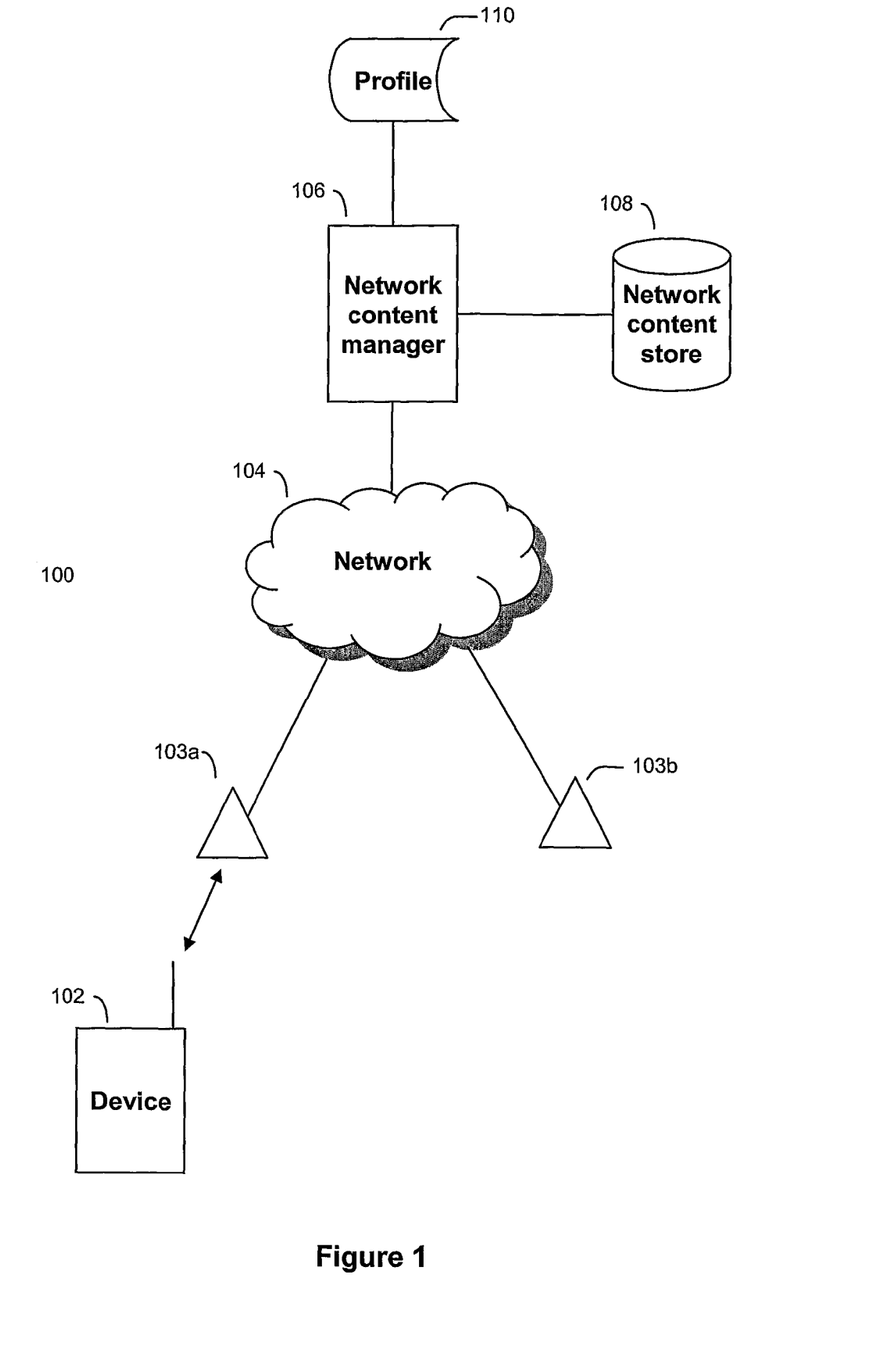
FIG. 1 is a network arrangement in an example of the present invention.

FIG. 1 illustrates a network 100 comprising a mobile device 102, a network 104, a network content manager 106, a network content store 108 and a profile 110. The mobile device 102 may be a mobile phone, smartphone, PDA or similar, having WiFi (IEEE 802.11) connectivity. The mobile device may also have conventional mobile cellular capabilities in the form of 3G or GPRS connectivity. The mobile device 102 communicates with the network content manager 106 over the network 104, which may include the Internet for example, and more specifically by way of one of two (or more) WiFi access points 103a and 103b. Each WiFi access point 103a and 103b has an associated coverage area or "hotspot". Thus, when the mobile device 102 is within range of the hotspot of WiFi access point 103a, a wireless network connection, and subsequent onward connection to the network 104, can be established via access point 103a. Alternatively, when the mobile device 102 is within range of the hotspot of WiFi access point 103b, a wireless network connection, and subsequent onward connection to the network 104, is made via access point 103b. Typically, the backhaul connections between the wireless access points 103a and 103b will be ADSL connections. This environment is an example of a user having a mobile device roaming between his office WiFi network/hotspot and a public WiFi hotspot for example. At some stage between the two hotspots, it is likely that the mobile device will not be connected to either access point and thus lose WiFi connectivity.

A person skilled in the art will appreciate that many of the individual components of the backhaul network access points 103a/103b and network 104 have been omitted for simplicity.

The network content manager 106 is a server on the network side that controls the transfer of multimedia content to the mobile device 102. The network server has access to a network content store 108, which stores multimedia content for transferring to the mobile device 102. The multimedia content is typically video, such as films, television shows, sports clips and so forth, but may also include other multimedia content such as music, pictures and even software. The network content manager 106 also has access to a profile store 110 which stores users profiles such as the user of the mobile device 102.

Whilst the network content manager 106 and network content store 108 are shown as separate entities, a person skilled in the art will appreciate that the functionality described below can be provided by a single physical server.

Figure 2:
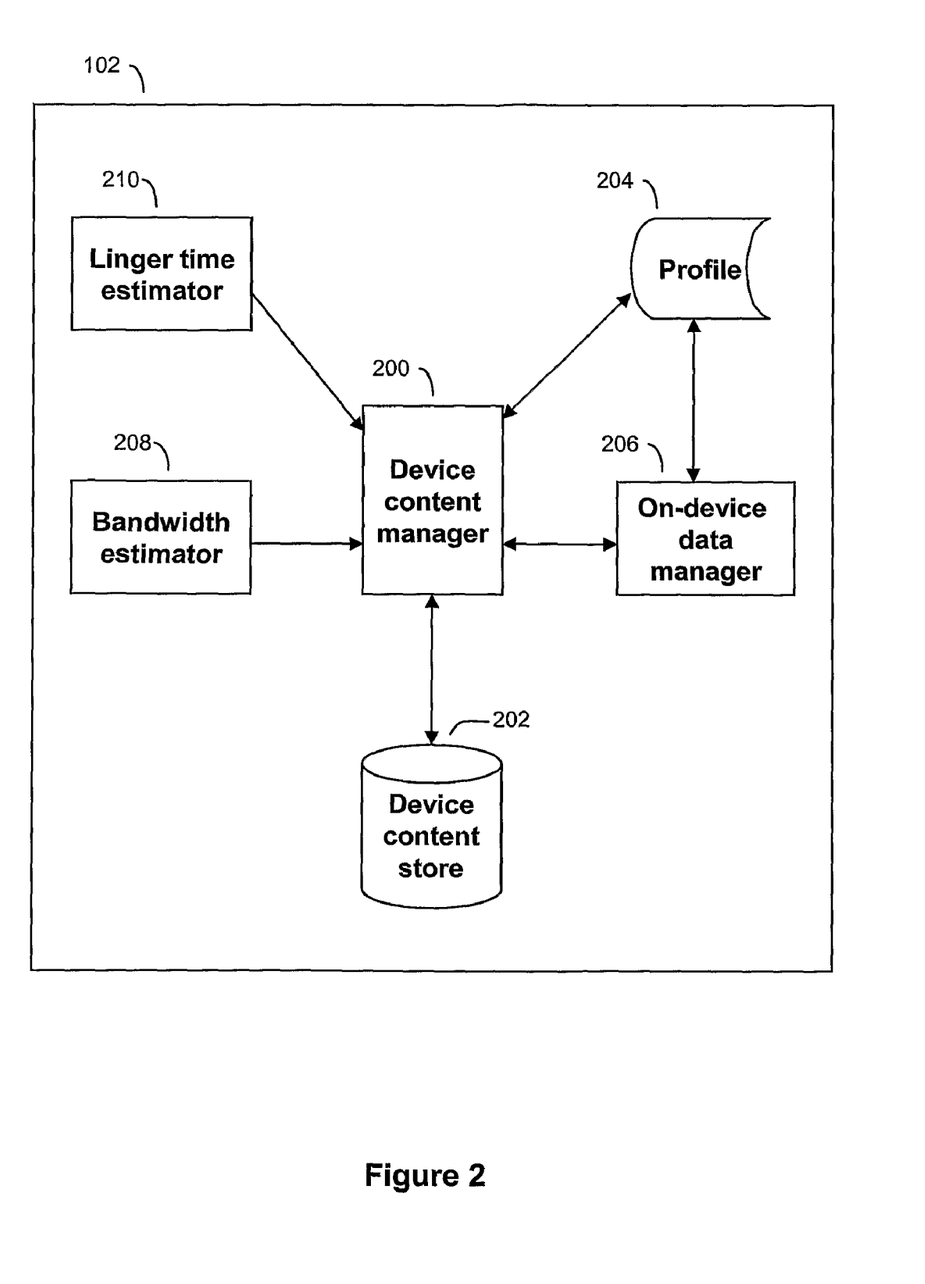
FIG. 2 is a detailed diagram of a mobile device in an example of the present invention.

The mobile device 102 is shown in more detail in FIG. 2. The mobile device 102 comprises several important elements including a device content manager 200, a device content store 202, a device profile store 204, an on-device data manager 206, a bandwidth estimator 208 and a linger time estimator 210. The device profile store 204 stores user profiles, and more specifically, the user profile of the user associated with the mobile device 102. The user profile stored in the device profile store 204 is mirrored in the network profile store 110.

Whilst the elements in the mobile device 102 have been shown as separate entities, a person skilled in the art will appreciate that their function can be provided by a single controller module with access to a suitable data store.

The device content store 202 has a storage capacity of C for storing multimedia content in accordance with examples of the invention. At any given time, the mobile device 102 has D pieces of content stored in the device content store 202. Each item or file i on the device, where i∈[1,D], has an associated storage requirement Si(device). With D items of content stored, the available space left in the device content store is A. The content is ranked taking into account the likelihood of it being watched and the file size of the content.

Similarly, in the network, the network content store 108 has stored N pieces of content that the mobile device 102 doesn't already have. Each item or file j in the network, where j∈[1,N], has an associated storage requirement Sj(network). Each of these items of content N is also ranked in a similar way to each of the D pieces of content on the device in order of the likelihood of it being watched. The way in which the ordering is performed is described below.

When the mobile device 102 is within range of one of the access points 103a or 103b, and thus has a WiFi connection and is able to communicate with the network content manager 106, the device content manager 200 and the network content manager 106 communicate with each other about the pieces of content are held in their respective content stores. An algorithm is then run to determine which of the N pieces of content should be transferred from the network content store 108 to the mobile device 102, and also to whether any of the content D on the mobile device 102 needs to be deleted. The ranking of the content is used in the algorithm as are various other parameters.

The following parameters are used in the method, and are described before the method itself.

1. Interest Value—I

For each available piece of content within the system (both on the mobile device 102 and in the network content store 106), an interest value I is calculated. The interest value for item i on the device, where i∈[1,D], is denoted by Ii(device). Similarly, the interest value for item i in the network, where j∈[1,N], is denoted by Ij(network)

On the mobile device 102, the on-device data manager 206 calculates the interest value I for each of the pieces of content D stored in the device content store 202. The interest value Ii(device) is based on interest criteria associated with the user, which may be stored in a user profile stored in the user profile store 204. The user profile includes information on viewing history of different content, the user's feedback on previously watched content, and so forth.

A similar value of Ij(network) is also calculated for each piece of content N stored in the network content store 108. The interest value I may be calculated by the network content manager 106 or by the network content store itself 108, and utilises the user profile stored in the network profile store 204.

The following example outlines one method of calculating the interest value I.

Firstly, the system requires a lexicon of keywords, a profile for each user, and a description (in metadata) for each piece of content.

The lexicon is all the keywords used in the system. For simplicity, each profile comprises an exhaustive list of those keywords (i.e. the complete lexicon) where each keyword has a real number between −1 and +1 associated with it. That number indicates the preference of that user for that keyword.

For simplicity, each description is a list of keywords that applies to that piece of content.

Now for each user, to calculate an interest value for that piece of content, sum the real value preferences in that user's profile for all the keywords applicable to that item.

For example:
If the lexicon is: A, B, C, D, E
User A with the following profile: (A=0.5, B=0.9, C=−0.7, D=−0.6, E=−0.1)
Content X with description: C, E
Content Y with description: A, B, E Thus, for user A, the interest value I for content X=(−0.7)+(−0.1)=−0.8

And, for user A, the interest value I for content Y=(0.5)+(0.9)+(−0.1)=1.3

2. Weighted Interest—λ

For each piece of available content on the mobile device 102 and in the network content store 108, a "weighted interest" value λ is generated (λi(device) for the weighted interest value of item i on device, and λj(network) for the weighted interest value of item j in network). This value of λ should reflect that there is a resource cost associated with transferring the content. Consequently, for two pieces of content that have the same Interest value I, the content that required the least resource would be transferred. As the file size of the content has the most immediate impact on the resource required for transfer, one possible method for calculating the weighted interest for an item of content is:

$$\lambda = I/S \qquad (1)$$

where I is the interest value, and S is the storage requirement for the item of content. The weighted interest value λi(device) is calculated by the device content manager 200 for each item of content on the mobile device 102, and the weighted interest value λj(network) is calculated by the network content manager 106 for each item of content stored in the network. Alternatively, metadata used to describe the content in the network can be transferred onto the mobile device 102 and λj(network) can be calculated by the mobile device 102.

The weighted interest value λ thus provides a useful way of ranking the content stored on the mobile device 102 and in the network. Thus, content that is small is preferred as it is easier (in terms of resource cost) to transfer, and similarly content that has a high interest value is preferred so that content that is likely to be watched by the user is transferred.

3. Linger Time—Lte

One important aspect of the invention is the "linger time" LTe, which is used to predict how long the mobile device 102 is expected to be "in-range" of a wireless hotspot and thus is a measure of how long a network connection can be expected to last. There are several possible methods for generating this, one of which is the use of a trained Bayesian network.

A Bayesian Network (BN) can be represented with a directed acyclic graph, where nodes represent variables and the arcs between the nodes represent dependencies. A variable may be discrete, having a finite or countable number of states, or it may be continuous. Node A is a parent of node B, and thus B is a child of A, when there is an arc pointing from node A to B.

By definition, a directed acyclic graph is a BN relative to a set of variables if the joint distribution of the node values can be written as the product of the local distributions of each node and its parents:

$$P(X_1, \ldots , X_n) = \prod_{i=1}^{n} P(X_i \mid \text{parents}(X_i)) \qquad (2)$$

where a set of parent nodes of Xi is denoted by parents(Xi).

If node Xi has no parents, its local probability distribution is said to be unconditional, otherwise it is conditional. If the value of a node is observed, then the node is said to be an evidence node.

Figure 3:
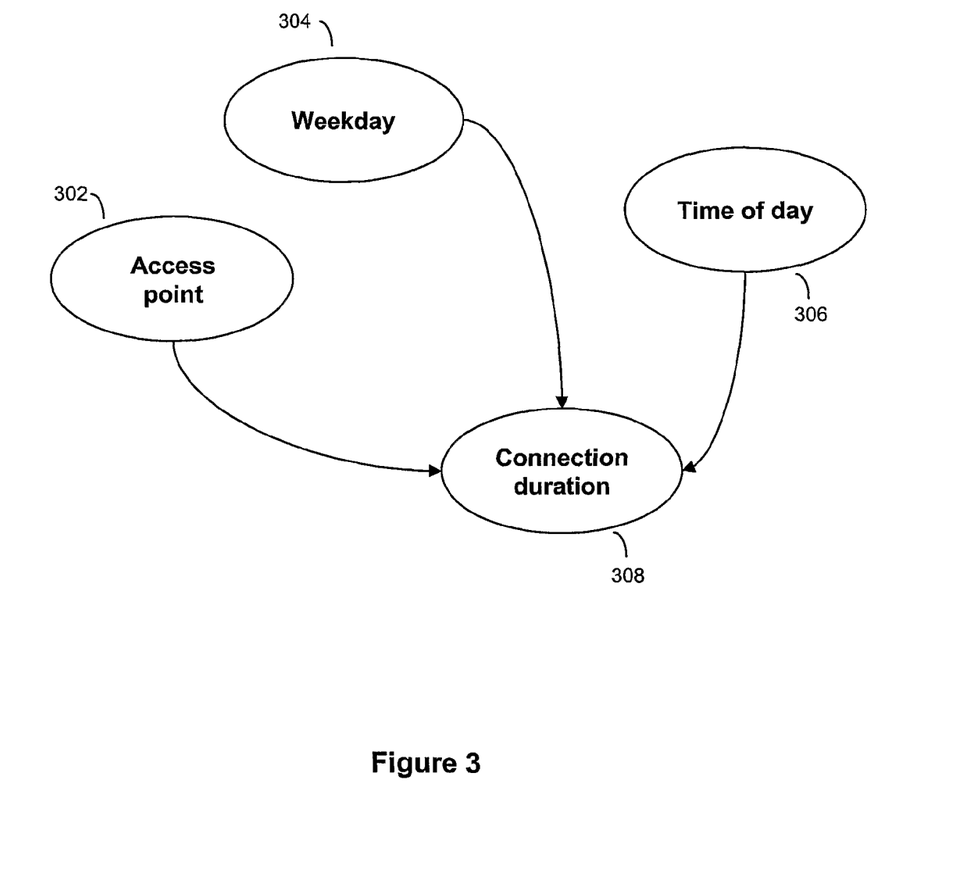
FIG. 3 is a Bayesian network used to calculate a user's linger time in an example of the present invention.

In order to fully specify the BN it is necessary to specify the conditional probability of each node upon its parents, this process is called parameter learning FIG. 3 shows a Bayesian Network 300 that is used to calculate the predicted duration of a user's connection, or linger time. The nodes within the graph are:

Access Point 302—The Wi-Fi access point to which is the user is connecting

Weekday 304—The weekday on which the connection is made

Time of day 306—The time at which the connection is made

Connection duration 308—The duration the user is connected for

The graph shows that the probability of a specific connection duration is dependent on the weekday, the time of day and the access point in use.

In order to fully specify the Bayesian network it is necessary to specify the conditional probability of each node upon its parents, this process is called parameter learning.

In general, this requires an extensive dataset containing historical information that can be used to "train" the Bayesian Network.

In the case of linger time, this dataset can be created by collecting information on the connection behaviour of a user over a period of several weeks. For every connection a user makes, the mobile device 102 should record the time, weekday, unique name (BSSID for WiFi) of the access point that it connected to, and the duration that the device was connected for. Collating this information provides a dataset which can be used to train the Bayesian network, allowing it to calculate the conditional probability of the connection duration based on time, weekday and access point. Over a period of time, as more connections are recorded and used to train the Bayesian Network, it becomes more accurate in predicting linger time.

Because a Bayesian network is a complete model for the variables and their relationships, it can be used to answer probabilistic queries about them. In this scenario the query is "what is the most likely connection duration given the current weekday, time of day and access point?" Since the trained Bayesian Network knows the probability distribution for the connection duration for any given time, day and access point it is able to select the duration with the highest probability. In practice, rather than utilising exact values for connection duration, intervals are likely to be used (e.g. 0-5 minutes, 5-10 minutes, etc.). This interval is the predicted linger time for the connection.

The Bayesian Network is implemented on the mobile device 102 and is used as part of the linger time estimator 210. It should be noted that the linger time estimator 210 can only use the Bayesian Network technique if the user has previously connected to an access point, and that it cannot be accurately used until sufficient data has been collected to train it. Thus, a more basic method, such as average connection time, should be used to predict linger time in cases where the Bayesian Network has yet to be sufficiently trained.

4. Bandwidth Estimation—Be

Another parameter that is calculated is an estimation of the available bandwidth Be of the connection between the mobile device 102 and the network content store 108.

Techniques used may be based on round trip times and historical data relating to the access point being used and other network data.

The bandwidth estimation Be is calculated by the bandwidth estimator 208 in the mobile device 102.

Figure 4A:
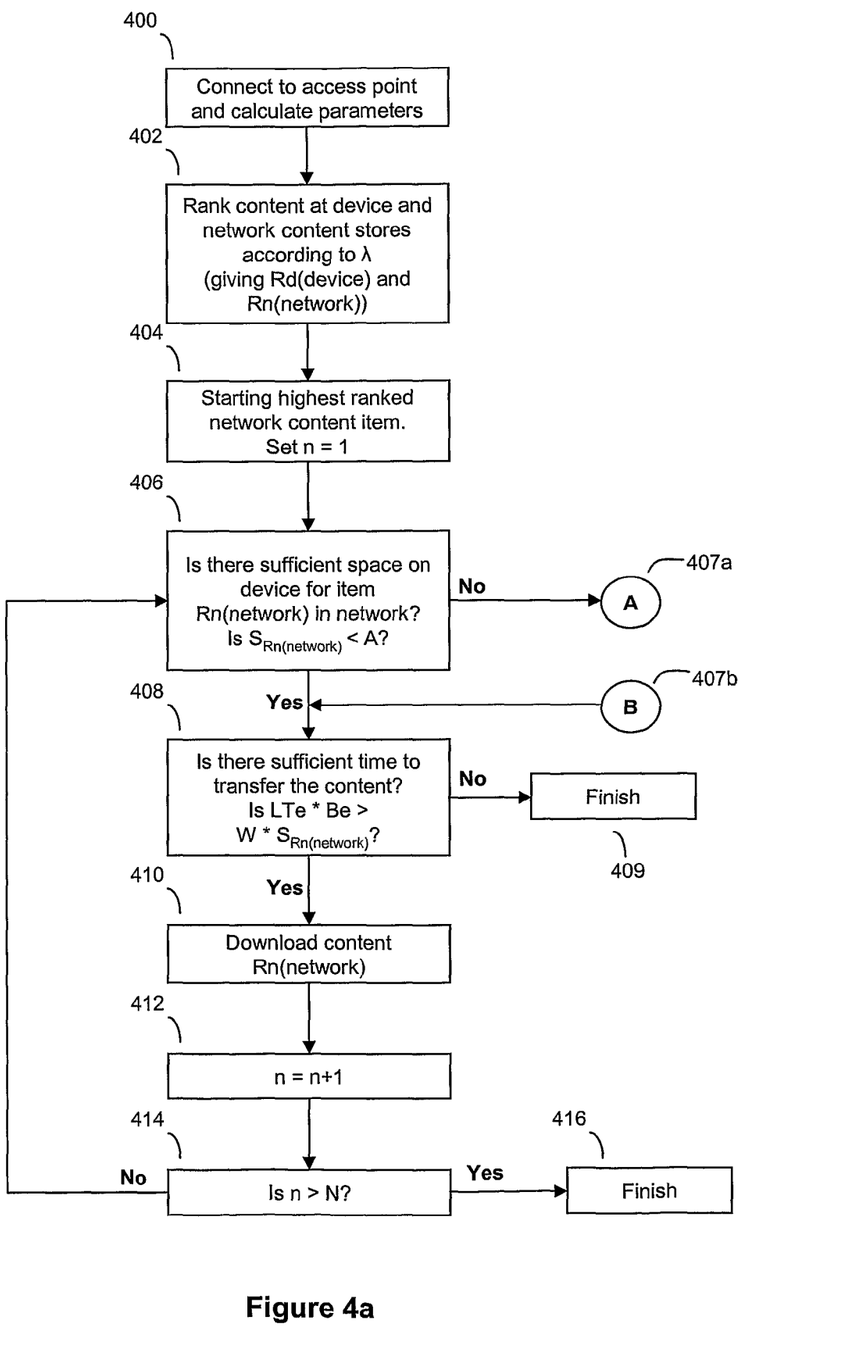
FIG. 4a is a flow chart illustrating the operation of a method in an example of the present invention.
Figure 4B:
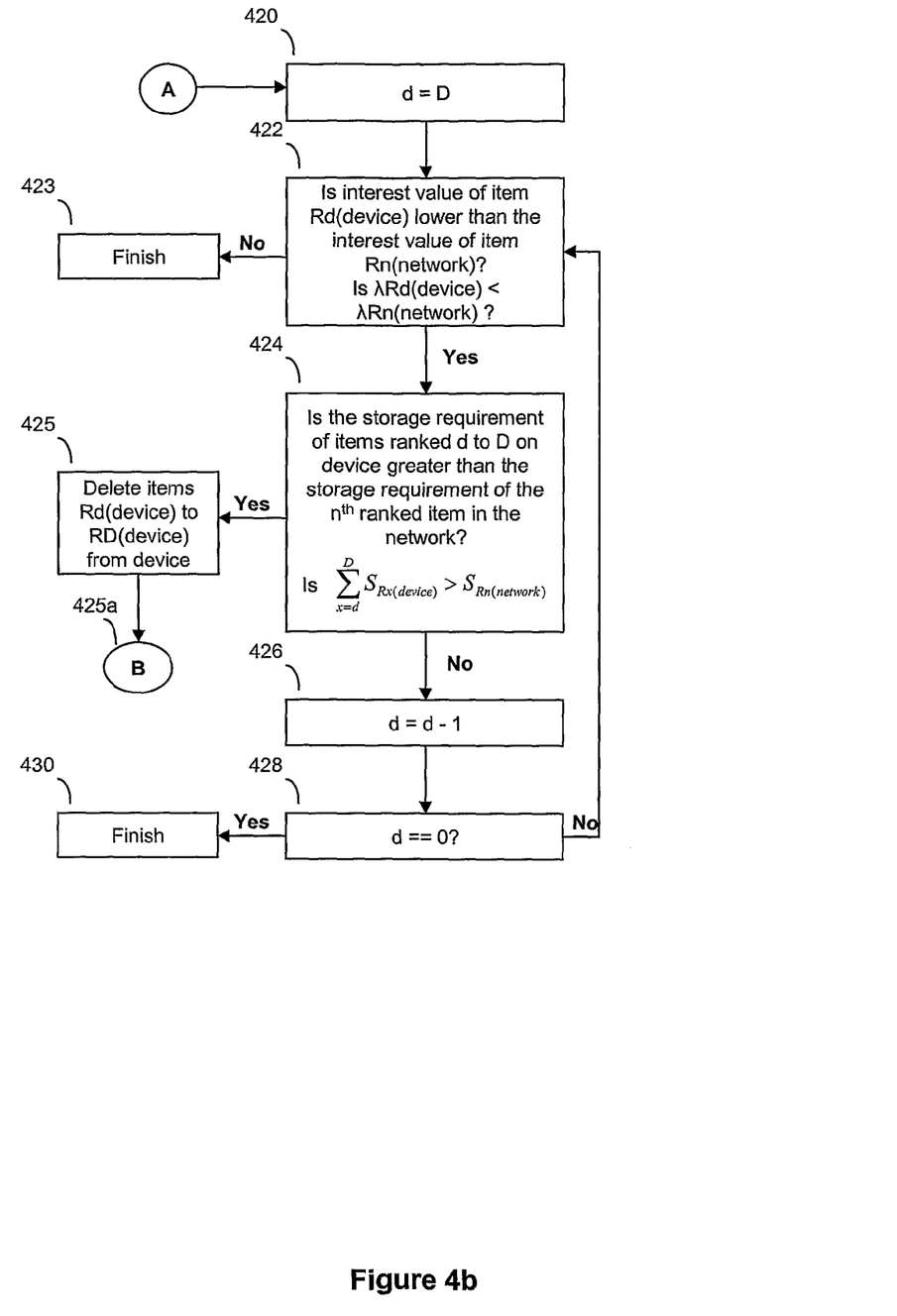
FIG. 4b is a flow chart illustrating further steps in the method.

FIGS. 4a and 4b are flow charts illustrating the method for managing content on the mobile device 102 in an example of the present invention.

In step 400, the mobile device 102 makes a connection with one of the access points and a further connection with the network content manager 106. The above parameters are then calculated by the relevant modules in the mobile device 102 or by the network content manager 106, and gathered by the device content manager 200.

Step 400 includes calculating by the device content manager 200 the weighted interest value $\lambda i(device)$ for each of the i items, where $i \in [1,D]$, of content currently stored in the device content store 202.

Similarly, the network content manager 106 calculates the weighted interest value $\lambda j(network)$ for each item of the j items, where $j \in [1,N]$, of content currently stored in the network content store 202.

The weighted interest value $\lambda j(network)$ may be calculated after a connection between the mobile device 102 and the network content manager 106 has been established. Alternatively, the weighted interest value can be calculated periodically by the network content manager 106 so that when a connection is made, the method for managing the content on the device can be initiated without delay. Similarly, the weighted interest value $\lambda i(device)$ for the items on the device can also be calculated in advance of a connection between the mobile device 102 and the network content manager 106.

In step 402, the D items of content are then ranked in order of their weighted interest value, with the item having the highest weighted interest ranked first. Each item is thus assigned a ranking number d, where d=1 is the highest rank, and where Rd(device) returns the item i of the item ranked d. The N items of content in the network are also ranked similarly, and where Rn(network) returns the item of content j ranked n.

The device content manager 200 then utilises the parameters and rankings to determine how best to handle the content on the mobile device 102, including which items of content to transfer from the network content store 108 to the mobile device 102. To this end, the network content manager 106 forwards the content rankings to the device content manager 200, so that the device content manager 200 can proceed accordingly.

In step 404, the first ranked item (i.e. rank n=1) of content stored at the network content store 108, is selected.

In step 406, a check is made to determine if there is sufficient capacity in the device content store 202 for the first ranked item of content stored at the network content store 108. Effectively, the available capacity A on the device content store 202 is checked against the storage requirement $S_{Rn(network)}$ for first ranked item (where n=1), represented by the following inequality:

$$S_{Rn(network)} < A \qquad (3)$$

Note, the available storage A will depend on what content is already stored on the device as well as the total storage capacity of the device C.

If there is insufficient storage capacity i.e. if the inequality test (3) is not satisfied, then processing proceeds to step 407a, and onto FIG. 4b, and is discussed below. However, if there is sufficient storage, processing proceeds to step 408.

In step 408, a test is made to see if there is sufficient time to download the item of content Rn(network). This test is represented by the following inequality:

$$LTe * Be > W * S_{Rn(network)} \qquad (4)$$

where,

Lte is the current linger time for the present situation;

Be is the bandwidth of the network connection;

$S_{Rn(network)}$ is the storage capacity requirement for the item of content ranked n; and W is a weighted error value >1.0, to allow for inaccuracies in the parameters (e.g. can set to around 1.2)

Thus, the test is to determine if there is sufficient bandwidth Be and Linger Time LTe to have time to transfer the data, scaled by a weighted error value. If so, then processing continues to step 410, which starts download of item Rn(network) onto the mobile device 102. The download takes place over a WiFi connection with one of the two access points 103a or 103b that the mobile device 102 is connected to at the time. The downloaded item can be stored in the device content store 202 until the user wishes to use it.

In alternative arrangements, steps can be taken to determine if any of the other items of content are smaller and can be downloaded instead.

Once the download is completed in step 410, item Rn(network) can be removed from the network content store, and processing continues to step 412, where the ranking n is incremented by 1 to process the next ranked item.

In step 414, a test is made to determine if the incremented value of n exceeds the total number of items in the network content store. If so, processing finishes—step 416. If not (i.e. the incremented item is a valid item in the store), then processing reverts back to step 406 to determine if the next ranked item can be downloaded as for the previous item.

Turning now to the situation in step 406 where there is insufficient storage capacity. Thus, if inequality test (3) is not satisfied, then processing proceeds to step 407a, and onto step 420 of FIG. 4b.

FIG. 4b describes steps used to free up more storage capacity from the device storage means by looking at the relative interest values of the items of content on the device relative to a given item of content in the network (that we are trying to transfer).

In step 420, we begin by setting d=D, where d is the weighted interest ranking number and D is the total number of items of content stored on the device. Thus, we start by selecting the last ranked item of the items stored on the device.

In step 422, we check to see whether the interest value of the item ranked d, item Rd(device), is lower than that of the item Rn(network) selected. Therefore, we test whether $$\lambda Rd(\text{device}) < \lambda Rn(\text{network}) \quad (5)$$

If the interest value of the network item Rn(network) is not more than that of the device item Rd(device), then processing finishes in step 423. Put another way, if the current ranked network item is not more interesting than the current ranked device item, then there is no reason to try and remove the current device item.

If the interest value of the network item Rn(network) is more than that of the device item Rd(device), then processing continues to step 424.

In step 424, we check to see if the storage requirement for the items ranked d to D, i.e. items Rd(device) to RD(device), require more storage than that of the selected network item Rn(network). The test can be represented as:

$$\sum_{x=d}^{D} S_{Rx(device)} > S_{Rn(network)} \quad (6)$$

If the total storage requirement of items Rd(device) to RD(device) exceed that of the item Rn(network), then items Rd(device) to RD(device) are deleted from the device storage in step 425 to make room for item Rn(network), and processing reverts back to FIG. 4a, step 408.

If the storage requirement for the items Rd(device) to RD(device) do not exceed that of the selected network item Rn(network), processing continues to step 426, where the next ranked item is selected (in reverse order of interest) i.e. d=d−1. In step 428, a check is made to determine if the ranking number has reached 0, in other words if the highest ranked item has been exceeded. If so, processing finishes in step 430, if not, processing reverts back to step 422 to determine whether the interest and storage requirements are met and thus whether to delete the appropriate items from the device.

Steps 422 to 428 are thus repeated until the test in step 424 is satisfied and an items from the device can be deleted to accommodate the network item Rn(network), and then reverts back to FIG. 4a. Alternatively, processing can finish entirely if all the device items have been tested i.e. d=0.

It should be noted that steps 422 and 424 can be performed in either order. The test is to determine if there are items on the device that can be deleted that are of less interest than the network item that we are trying to transfer. The order of the two tests in steps 422 and 424 are not important.

In an alternative method, each item of content can be split into component parts, and each component part may be downloaded separately, using LTe and Be for the calculations.

Processing also finishes if the mobile device 102 disconnects from the access point at any time, and thus terminates its connection with the network content manager 106 and network content store 108.

Once the method is terminated for whatever reason, the process can be repeated next time the mobile device 102 comes within range of an access point and makes a connection with the network content manager 106. When a new connection is made, a check can be made to determine if there is any new content to be transferred, or indeed if any of the content on the device should be deleted because of a change in circumstances. For example, an item that has been watched, may still be maintained or indeed have a higher preference to be maintained, which in turn could be managed by increasing its interest value.

The user of the mobile device 102 may also manually delete some of the device content items once it has been watched, or if it is simply not desired.

Whilst the above examples have been described in relation to a mobile device moving into range of a WiFi access point, and thus establishing a WiFi connection with the network 104 and onto the network content store 108, the method can equally be applied to a 3G or other wireless network. However, the advantages using some other networks are minimised. In particular, one advantage of WiFi networks is that they tend to be relatively inexpensive and also have fast data transfer rates.

Therefore, in general, it is noted herein that while the above describes examples of the invention, there are several variations and modifications which may be made to the described examples without departing from the scope of the present invention as defined in the appended claims. One skilled in the art will recognise modifications to the described examples.

The invention claimed is:

1. A method of data management between a mobile device and a network data store in a wireless network, said method comprising:
   (i) establishing a connection between the mobile device and the network data store by way of a wireless access point;

(ii) estimating a connection duration between the mobile device and the wireless access point, and the bandwidth of the connection between the mobile device and the wireless network;

(iii) determining if the mobile device has sufficient available storage for storing a network file selected from the network data store, said network file having an interest value based on a user profile, and the mobile device comprising a plurality of device files ranked in order of the interest value, wherein if it is determined that the mobile device does not have sufficient available storage for the selected network file, then deleting one or more device files starting with the device file with lowest ranked interest parameter until the mobile device has sufficient available storage for the network file, wherein the network file selected is a data file with a highest ranked interest value;

(iv) determining if there is sufficient time to load the selected network file from the network data store to the mobile device in dependence on the estimated connection duration and the estimated bandwidth; and (v) loading the selected network file from the network data store to the mobile device by way of the access point if it is determined that there is sufficient available storage and sufficient time to transfer the selected network file.

2. A method as claimed in claim 1, wherein the estimated connection duration is dependent on prior connection history between the mobile device and said wireless access point.

3. A method as claimed in claim 1, wherein the network content store comprises a plurality of data files, and the selected network file is selected from the plurality of data files.

4. A method as claimed in claim 3, wherein the plurality of data files are ranked in order of an interest parameter value, said interest parameter value based on a user profile, and wherein the network file selected, which is the data file with the highest ranked interest value, is the data file with the highest ranked interest parameter value.

5. A method as claimed in claim 4, wherein after the selected file is transferred, the data file with the next highest ranked interest parameter value is selected.

6. A method as claimed in claim 1, wherein only the device files having an interest parameter value lower than that of the selected network file are deleted from the mobile device.

7. A method as claimed in claim 1, wherein the data files are multimedia files.

8. A method as claimed in claim 1, wherein the network files transferred to the mobile device are stored on the mobile device for later use.

9. A system for data management between a mobile device and a network data store in a wireless network, said system comprising:

a connection unit configured to establish a connection between the mobile device and the network data store by way of a wireless access point;

a connection duration estimator, including a computer processing system having at least one computer processor, for estimating a connection duration between the mobile device and the wireless access point;

a bandwidth estimator, including the processing system, for estimating the bandwidth of the connection between the mobile device and the wireless network;

a content manager, including the processing system, for determining if the mobile device has sufficient available storage for storing a network file selected from the network data store, said network file having an interest value based on a user profile, and the mobile device comprising a plurality of device files ranked in order of the interest value, wherein if it is determined that the mobile device does not have sufficient available storage for the selected network file, then deleting one or more device files starting with the device file with lowest ranked interest parameter until the mobile device has sufficient available storage for the selected network file, and for determining if there is sufficient time to load the selected network file from the network data store to the mobile device in dependence on the estimated connection duration and the estimated bandwidth, wherein the network file selected is a data file with a highest ranked interest value; and a transfer unit configured to transferring the selected network file from the network data store to the mobile device by way of the access point if it is determined that there is sufficient available storage and sufficient time to load the selected network file.

10. A system as claimed in claim 9, wherein the estimated connection duration is dependent on prior connection history between the mobile device and said wireless access point.

11. A system as claimed in claim 9, wherein the network content store comprises a plurality of data files, and the selected network file is selected from the plurality of data files.

12. A system as claimed in claim 11, wherein the plurality of data files are ranked in order of an interest parameter value, said interest parameter value based on a user profile, and wherein the network file selected, which is the data file with the highest ranked interest value, is the data file with the highest ranked interest parameter value.

13. A system as claimed in claim 12, wherein after the selected file is transferred, the data file with the next highest ranked interest parameter value is selected.

14. A system as claimed in claim 9, wherein only the device files having an interest parameter value lower than that of the selected network file are deleted from the mobile device.

15. A mobile device comprising:

a connection unit configured to establish a connection with a network data store by way of a wireless access point;

a plurality of device files ranked in order of an interest value; and a processing system, having at least one computer processor, configured to:

estimate a connection duration between the mobile device and the wireless access point;

estimate the bandwidth of the connection between the mobile device and the wireless network;

determine if the mobile device has sufficient available storage for storing a network file selected from the network data store, said network file having the interest value based on a user profile, deleting one or more device files starting with the device file with lowest ranked interest parameter until the mobile device has sufficient available storage for the selected network file if it is determined that the mobile device does not have sufficient available storage for the selected network file, wherein the network file selected is a data file with a highest ranked interest value;

determining if there is sufficient time to load the selected network file from the network data store to the mobile device in dependence on the estimated connection duration and the estimated bandwidth; and receiving the selected network file from the network data store by way of the access point if it is determined that there is sufficient available storage and sufficient time to load the selected network file.

16. A mobile device as claimed in claim 15, wherein the estimated connection duration is dependent on prior connection history between the mobile device and said wireless access point.

17. A mobile device as claimed in claim 15, wherein only the device files having an interest parameter value lower than that of the selected network file are deleted from the mobile device.

* * * * *